Inventor
Romeo Saglioni
By Emil Bönnelycke
Attorney

April 15, 1930.  R. SAGLIONI  1,754,697
CHANGE SPEED GEARING
Filed April 11, 1927  2 Sheets-Sheet 2
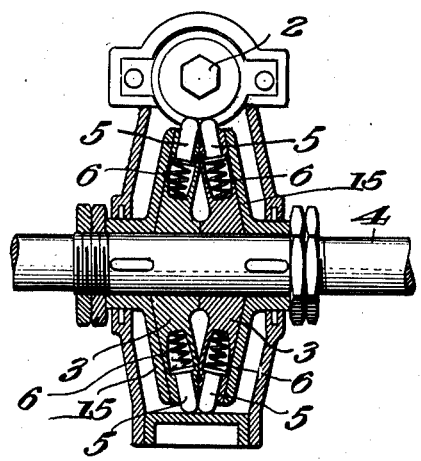
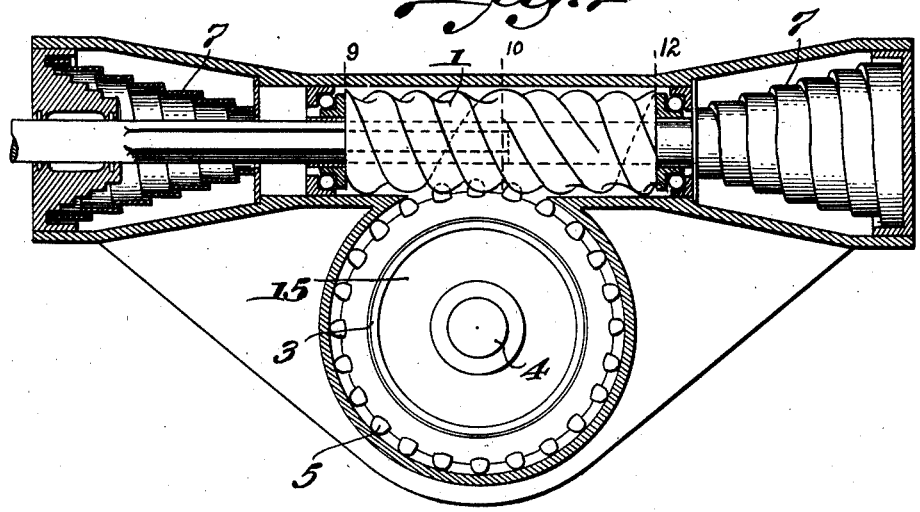
Inventor
Romeo Saglioni
By Emil Bönnelycke
Attorney Patented Apr. 15, 1930

1,754,697

UNITED STATES PATENT OFFICE

ROMEO SAGLIONI, OF CALTAGIRONE, ITALY

CHANGE-SPEED GEARING

Application filed April 11, 1927, Serial No. 182,816, and in Italy April 14, 1926.

This invention relates to gearing for driving one shaft from another, and is suitable for use on motor cars, tramcars, lifts and other machines where a variation of the speed of the driven shaft or shafts in relation to the driving shaft is desired. The invention also embodies means for reversing the rotation of the driven shaft or shafts.

Briefly, the invention consists in providing on the driving shaft a helical thread or screw, the pitch of which varies, and in using in conjunction with the same a toothed wheel or wheels on the driven shaft or shafts, the said teeth being pressed outwardly by springs.

The screw is slidable on its shaft and may be shifted in one direction by a coil spring against which it is moved by any suitable lever or other device, or it may be acted upon from both sides by such springs and be shifted by a lever or the like.

The employment of this gearing dispenses with the usual change-speed gear mechanism, and the driven wheels may take the place of the usual differential gear.

The invention will be described as applied to motor cars or tram cars; but it will be apparent that it can likewise be applied to cranes and other machines and mechanisms where a variation in the speed of the driven shaft or member is desired and for adjustment according to the load and, in the case of a motor car or tram car, the gradient.

In the accompanying drawings:

Fig. 3 is a part-sectional end view of a modification; and

Fig. 4 is a side view of Fig. 3.

The drawings are in part diagrammatic and omit the control mechanism, which may be of any suitable kind, and by which the screw can be moved along its shaft.

Figure 1:
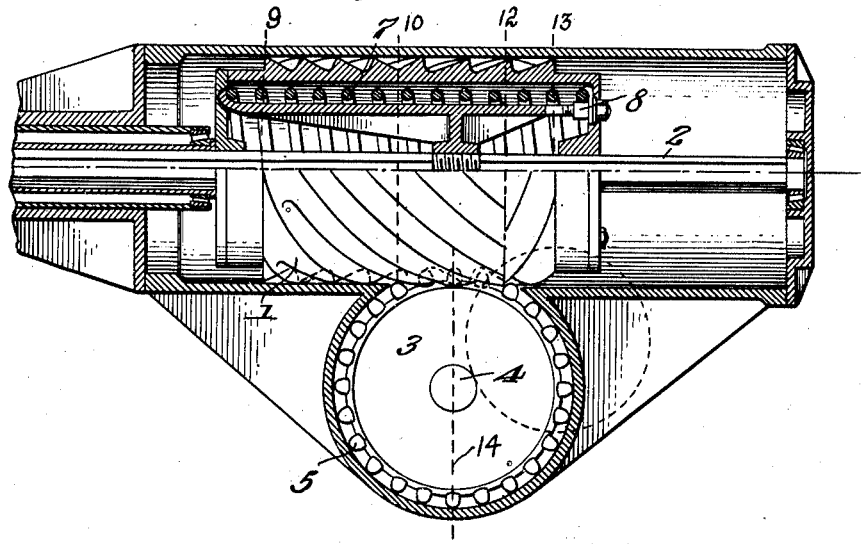
Figure 1 is a part-sectional side elevation of a form of gearing suitable for use on motor cars.
Figure 2:
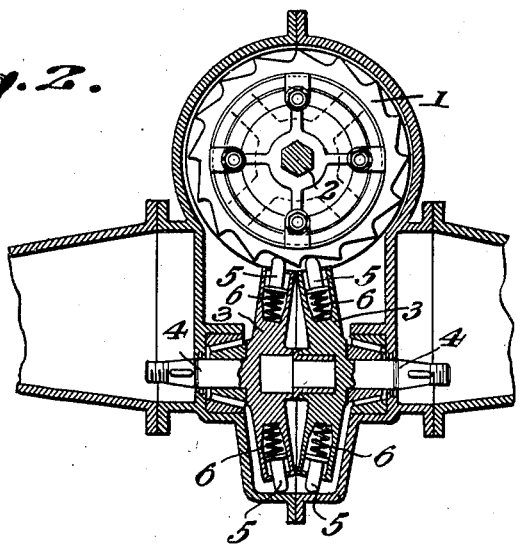
Fig. 2 is a central cross-section thereof.

Referring to Figs. 1 and 2, the screw sleeve 1 is slidable on shaft 2 and drives two wheels 3, 3 rigidly secured to shafts 4, 4 and mounted upon ball bearings. These wheels 3, 3 are provided with teeth 5 that are pressed radially outward by springs 6, and they are simultaneously but independently driven by the screw 1 and may rotate at different speeds, thus providing the differential movement required for the driving wheels of a motor car.

The screw 1 is shown in nearly its intermediate position and is pressed towards the left by the spring 7, the strength of which may be adjusted by turning the screw cap 8.

The shaft 2, with the screw 1 thereon, is movable against the pressure of spring 7 by means of a lever or equivalent acting on the prolongation of the said shaft. The pitch of the screw from points 9 to 10 varies and is steeper than that from points 10 to 12, and from points 12 to 13 it is reversed, so that two ratios of speed are obtained, one by the parts 9—10 and the other by the part 10—12, while reverse is effected by the part 12—13, with a neutral position at 12.

The portion 9—10, which is designed to effect forward motion, has its grooves directed toward the right, and those of the portion 10—12 are also directed toward the right; while the portion 12—13 for effecting rearward motion has its grooves directed toward the left.

The wheels 3, 3 have been shown as fixed directly to the wheel axles 4, 4 but they may be connected thereto by reducing gear if desired.

It will be observed that the teeth 5 have rounded outer ends, so that when the engine is running and the screw stands with the neutral portion 12 opposite the part or line 14, the said teeth in engagement with the screw are simply pushed back against their springs and no movement of the car takes place; but immediately the screw is moved lengthwise, it drives the wheels and the car commences to travel.

If the power of the engine is reduced while the car is traveling, the car can drive the wheels 3, 3 and thus set up or produce a braking effect which can be advantageously used when a reduced speed is required.

It will be seen from the above that the mechanism is very simple and easily manipulated, and that for motor cycles only one wheel, much the same as wheel 3, will be needed.

In Figs. 3 and 4, the same reference numbers are used as those in Figs. 1 and 2 for substantially like parts; but in this construction the wheels 3, 3 are held to the shaft 4 by friction members 15, 15. The shaft may carry any suitable number of wheels such as 3.

With this gearing, the engine can be allowed to turn at its normal speed or at any predetermined speed, and the rate of travel of the vehicle, whether motor car, motor cycle or tram car, can be regulated in accordance with traffic requirements and road inclinations.

The gearing can be used as a brake by simply switching off the ignition current; and instead of using a spring or springs, the screw may be shifted by any other suitable means.

I claim as my invention:

1. Change-speed gearing, comprising a driving shaft, a sleeve shiftable axially thereon in either direction and formed with a single one-piece screw of varying pitch, a driven shaft, a wheel secured to the driven shaft and provided with a set of teeth for engagement with said screw, and a spring constantly acting on one end of the screw sleeve to force it in one direction.

2. Change-speed gearing, comprising a driving shaft, a sleeve shiftable axially thereon in either direction and formed with a single screw, a driven shaft, a wheel secured to the driven shaft and provided with a set of teeth for engagement with the screw; said screw embodying a plurality of distinct, integrally-connected portions for effecting forward rotation of the wheel at different speeds, each such portion having a gradually varying pitch; and a spring constantly acting on one end of the screw sleeve to force it in one direction.

3. Change-speed gearing according to claim 2, in which the screw embodies an additional distinct portion for effecting reverse rotation of the wheel.

In testimony whereof I affix my signature.

ROMEO SAGLIONI.